April 26, 1966  J. M. CHILTON  3,247,916
AUTOMATIC WEIGHING APPARATUS
Filed May 3, 1965  2 Sheets-Sheet 2

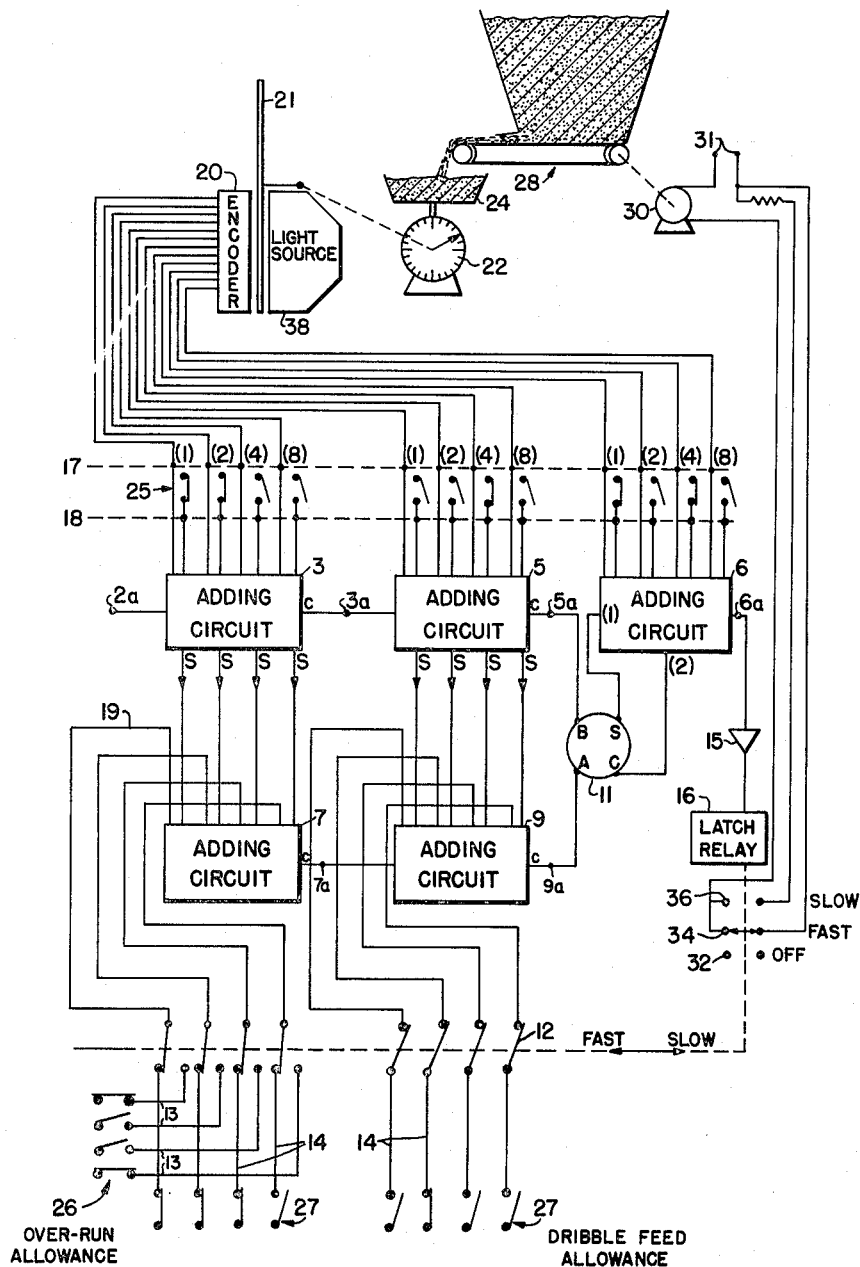

INVENTOR
JOHN M. CHILTON
BY
Norris & Bateman
ATTORNEYS 3,247,916
AUTOMATIC WEIGHING APPARATUS
John Moorhouse Chilton, 276 Court Oak Road,
Harborne, Birmingham 32, England
Filed May 3, 1965, Ser. No. 452,494
Claims priority, application Great Britain, Oct. 5, 1961,
35,844/61
12 Claims. (Cl. 177—81)

This application is a continuation-in-part of my copending application Serial No. 228,400, filed October 4, 1962, now abandoned.

The present invention relates to automatic weighing apparatus of the type adapted to provide without manual intervention a weighment determined by the setting of electrical switches which may be part of a punched card or tape reader or other switching arrangement, and more specifically to a novel arrangement wherein our recorder is used to produce an instantaneous indication of weight of material in the weigh hopper in a digital form which is applied to an electronic adder of a form uniquely adapted for weighing systems for controlling the material feed rate and cut-off point to provide accurately controlled weighments in a weigh hopper.

In United States Letters Patent No. 3,035,648, a system is illustrated wherein a scanner is used in connection with a scale and the sensed weight values are represented by electrical pulses which are counted. The attainment of predetermined counts in the counting means causes actuation of automatic controls which respond to the weighment in the hopper. These controlling pulse counts differ by relatively small, but critical pulse count values. Such a system requires either mechanical repetitive scanning mechanisms, or reliance on memory of the history of change in conditions of the weighing system from the time that the weigh hopper was last empty of material. This reliance almost invariably causes complete loss of control if the power supply fails at any time during the intermediate period.

It is an object of the present invention to provide a novel system which allows the use of relatively simple digital devices in the weighing system and thus to provide a system which does not require reliance on memory of previous conditions which might be destroyed during normal operation of the system.

Other prior art systems rely for turning off feed control motors on coincidence detection. In such systems, a control signal is provided only at the instant when the weight of material in the weigh hopper equals the predetermined quantity. In such systems, momentary failure of the electric supply or other disturbing conditions at the selected cut-off point may cause complete loss of control of the material feed system.

Another object of this invention is to provide a novel automatic weighing system wherein means are provided to de-energize the feed motor in response to reaching a predetermined weight, with this means remaining active so long as the weight of material in the weigh hopper exceeds the required amount. Therefore, complete control of the feed motors exists all times even though a momentary loss of power may have occurred at a critical time in the operation of the digital counting system.

A further object of the present invention is to provide a novel automatic weighing system wherein precision components are not required which thereby enables standard quality components, many in the form of commercially available sub-units to be used and the system yet gives safety features equivalent to more expensive alternative systems.

Briefly, the present invention consists of adding to digital information of the instantaneous weight of material in a weigh hopper, digital information of the difference between a given number (i.e. 999) and the required weight to be delivered to the weigh hopper, and effecting a control operation on the feed when said addition reaches said given number plus one. A provision is made to add digital information as to an allowance, such as for example, a dribble feed allowance and/or an over-run allowance, and effecting a change from fast feed to slow feed when the weight of material in the weigh hopper is equal to the required batch weight less the dribble allowance and thereafter stopping the material feed when the weight of material in the weigh hopper is equal to the required batch weight less the over-run allowance.

Conveniently in said methods according to the invention, there is employed a given number that is equal to one unit greater than the digital capacity of the means effecting said addition, and instead of informing the adding means of the direct difference between said given number (i.e. 1000) and the required weight, there is informed the difference between said given number less one (i.e. 999), and one is separately added electronically to this difference and the instantaneous weight.

These and other objects of the invention will become more fully apparent from the claims, and from the description as it proceeds in connection with the appended drawings wherein:

FIGURE 1 is a diagrammatic view of the entire automatic weighing system of the present invention showing a reticule for converting the scale indicator shaft position into digital form;

Figure 3:
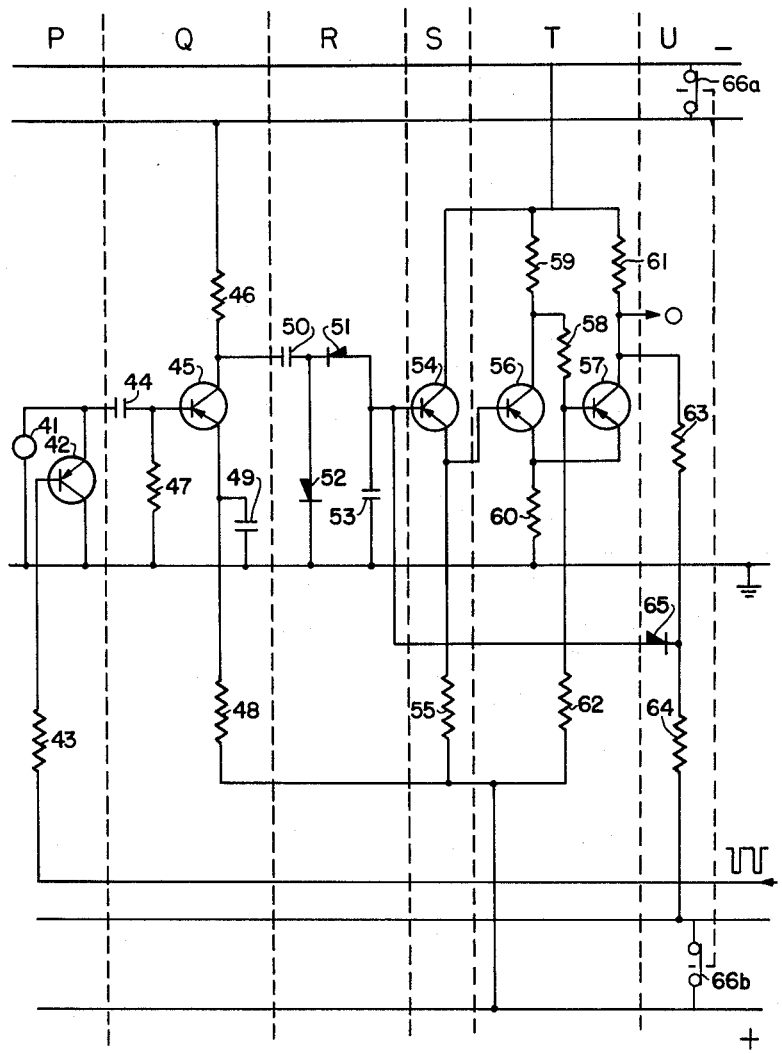
FIGURE 3 is a circuit diagram of an encoder which may be used in the system of FIGURE 1.

With reference now to the drawings, a scale 22 is provided with a weigh hopper 24 to which material is fed from a material feeding means 28 driven by motor 30. Motor 30 obtains power from terminals 31 and is controlled by the movable contacts associated with latch relay 16. Movable contacts are shown in the drawing at terminals 34 representing a fast feed condition which apply the full line voltage across motor 30. As the movable contacts move to the fixed contact position at 36 representing a slow feed condition, a reduced voltage is applied to motor 30 to thereby provide the slow feed. Thereafter, the movable contacts advance to the fixed contact position at 32 representing an off condition.

The movable contact on latch relay 16 advances each time the latch relay receives an energizing signal from amplifier 15. Amplifier 15 receives an output signal from adding circuit 6 on terminal 6a each time the counter transfers from 999 to a next higher order digit.

The adder of the present invention as illustrated in the figure is capable of handling a three-decimal digit number. The lowest order decimal digit, or units digit, is handled by adding circuit 3; the tens order digit is handled by adding circuit 5; and the hundreds order decimal digit is handled by adding circuit 6. In adding circuits 3, 5 and 6, each decimal digit is handled as a binary number composed of four binary orders 1, 2, 4 and 8. These are illustrated at terminal block 17. On each of terminals 1, 2, 4 and 8 at terminal block 17, the voltage will vary between two levels, one indicating a zero condition and the other indicating a units condition. Thus, if a units level voltage is present on terminals 1 and 4, and a zero level present on terminals 2 and 8 for adding circuit 3, the lowest order digit would be 5. The tens digit would be determined by the pattern of voltage levels on the individual terminals at the input to adding circuit 5, and the hundreds digit would be determined by the corresponding input voltage pattern on terminals for adding circuit 6.

Figure 2:
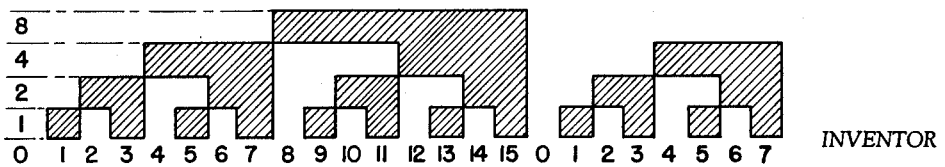
FIGURE 2 represents the pattern of the normal 0–15 binary code which may be used on the reticule with a photocell type encoder for producing a digital indication of the scale indication shaft position.

The pattern of the voltage levels present at each of the twelve terminals at terminal block 17 is determined by the conductive condition of photocells 20 which are positioned adjacent a wheel or coded reticule disc 21 which has alternate areas that are transparent and opaque to light from a light source 38. Reticule 21 is mounted to turn with the spindle of scale 22 and may have a conventional code pattern as shown in FIGURE 2, or preferably a novel code pattern as shown and claimed in my copending application Serial No. 217,763, filed August 17, 1962.

A separate photocell is provided in the circuit for each of the twelve leads going from encoder 20 to terminal block 17 so that the voltage level on each terminal is determined by the position of reticule 21. A photocell circuit especially adapted to provide a voltage that varies between two levels, one indicating a zero condition and one indicating a unit condition, is illustrated in FIGURE 3 and disclosed and claimed in my copending application Serial No. 250,257, filed January 3, 1963.

Referring now to FIGURE 3, in the digram the photocell 41 is assumed to be of the photo-voltage type (i.e. one which generates a potential and current when illuminated). The output of the cell 41 feeds a "chopper" stage P comprising a transistor 42 where the base is fed from a pulse generator (not shown) via resistor 43 with a constant train of pulses which are negative for a portion of the time and positive for the remainder of the time. Capacitor 44 charges from the photocell 41 via resistor 47 and the base emitter circuit of transistor 45 when the base of the transistor 42 is positive (i.e. the transistor 42 is non-conducting) and discharges into the amplifier stage Q consisting of the transistor 45, resistors 46, 47, 48 and capacitor 49, when the chopper input is negative.

The amplifier stage Q is a known type of A.C. transistor amplifier and the function of the chopping circuit is to convert the D.C. output from the photocell 41 to an A.C. signal since an A.C. amplifier avoids drifts problems which occur when amplifying small D.C. electrical signals. The output from the amplifier stage Q is connected to the network of the capacitors 50 and 53 and diodes 51 and 52 of a voltage doubler stage R which gives a D.C. output across the capacitor 53.

The D.C. output of the doubler stage R is connected to an emitter follower stage S comprising a transistor 54 and a resistor 55 to provide a high impedance input to reduce the current taken from the voltage doubler circuit, and to provide a low impedance output for operating a trigger circuit stage T. The trigger circuit stage T is of the type commonly known as a transistorised Schmitt trigger and comprises transistors 56 and 57 and resistors 58, 59, 60, 61 and 62. The operation of the trigger circuit is such that when the output of the emitter of transistor 54 is above a certain potential (measured negatively to the zero line) then the output voltage at the collector of transistor 57 will be a negative potential nearly equal to that of the negative supply, whereas when the emitter voltage of transistor 54 is below this given level transistor 57 conducts and the potential of its collector drops to nearly zero potential.

The function of the foregoing circuit is to produce a negative output voltage at the collector of transistor 57 when the light level on the photocell 41 exceeds a certain level, which would normally be arranged to occur when the photocell is half illuminated through the reticule disc 21 of FIGURE 1. Resistors 63 and 64 with a diode 65 comprise an electrical locking circuit stage U such that when a positive feed-back connection is made from the collector circuit of transistor 57 to the base circuit of the transistor 54 then the Schmitt trigger circuit and emitter follower are converted to form a bistable circuit.

The operation of encoder 20 which includes a storage system consisting of the trigger and locking stages T and U is controlled by the double pole switch 66a, 66b in the following manner:

When a read-out relay switch (not shown) is opened, it removes via its contact pair 66a the negative voltage supplied to the amplifier stage Q to render the latter inoperative. Simultaneously the positive potential applied to the lower end of resistor 64 through the other switch contact pair 66b is removed. The values of the resistors 63 and 64 are proportioned so that when the switch is closed, diode 65 is biased to the nonconducting state whatever the potential at the collector of the transistor 57. Thus, when the relay switch is opened, if the collector of transistor 57 is zero (i.e. with the photocell 41 dark) the diode 65 is still non-conducting so that the output from transistor 57 remains in the zero potential condition irrespective of further illumination changes on the photocell since the amplifier stage Q is inoperative. Alternatively, if the switch is opened while the transistor 57 is non-conducting, (i.e. with the photocell 41 illuminated) the potential applied to the diode 65 via resistor 63 from the collector of transistor 57 causes the diode 65 to conduct to hold the base of the emitter follower 54 sufficiently negative to hold the Schmitt trigger circuit T in condition with the collector of transistor 56 at zero potential and transistor 57 at negative potential, so that the output is held in the condition equivalent to the cell 41 being illuminated irrespective of further changes in illumination. When the contacts 66a and 66b are closed the cricuit is operative to sense a new state of the cell 41 ready to store this information when the switches are next opened.

Each adding circuit 3, 5 and 6 also has a second input terminal for each of the four binary channels which is connected to terminal block 18. Each terminal attached to terminal block 18 also has a voltage level which is one of two values, one indicating a zero condition and the other indicating a unit condition. The pattern of the voltage levels for each of the terminals connected to terminal block 18 may be set by electrical switches which may be actuated by a punched card reader, a tape reader, a manually operated dial switch or other suitable means for supplying a binary coded decimal digit. The numerical value represented by the pattern of voltage levels applied to the terminals on the terminal block 18 is equal to the difference between the count value which causes an output signal to appear at terminal 6a and the required weight.

The particular type of adding circuit 3, 5 and 6 which is used is no part of the present invention. However, such an adding circuit may be formed by logical circuits as used in computer technology, and half-adder circuits are especially well adapted for use in this system. Two half-adder circuits may be used for each binary order in each adding circuit 3, 5 and 6; the half-adder circuits may be of the type shown and claimed in my copending application Serial No. 214,372 filed August 2, 1962. Such a circuit is diagrammatically illustrated at 11 and basically contains two input terminals A and B, an output terminal for the sum indicated by S and another output terminal for carry indicated by C.

As a matter of convenience when considering the system of the present invention, the given number may be considered as being one unit greater than the capacity of the adding circuits, and the difference between one less than this given number and the required weight is fed to the adding circuits as one item of information and one unit is separately added to this difference. In the illustrated circuit utilizing a 999 unit capacity adder, the given number to which amplifier 15 is responsive is 1000; the difference between 999 and the required weight is fed to the adding circuits terminals 18. This procedure has the advantage of simplifying the steps of substraction in any unit forming this difference information as will become apparent from the following:

In order to clarify the description, the following numerical example is adopted with scale and adding circuit capacities of 999 units:

| | Units |
|---|---|
| Required weight | 456 |
| Dribble feed allowance | 27 |
| Over-run allowance | 9 |

In this example digital information is supplied to the terminals of terminal block 18 as to the difference between 999 and the required weight 456 i.e. terminals 18 receive in binary decimal coded form signals indicative of 543. Contacts 25 are thus set to provide a binary 3 to adding circuit 3; a binary 4 to adding circuit 5; and a binary 5 to adding circuit 6. To add one unit separately as above mentioned a standing voltage signal is applied to the carry input terminal 2a of the first adding stage 3.

In order to include the dribble feed and over-run allowances, an auxiliary adding circuit consisting of the units and tens decade binary adding stages 7 and 9 (similar to the circuits of stages 3 and 5) have one of their input terminals banks connected to the sum output terminals of the respective order adding stages 3 and 5 and their other input terminals are connected to the moving contacts of a multi-pole two-way switch 12. Switch 12 is arranged in any suitable manner to transfer from its illustrated position corresponding to fast feed to its other position which the moving contact associated with latch relay 16 moves to slow feed contacts 36.

To one set of fixed contacts of switch 12 is connected through lines 13 means, such as switches 26 or a reader, providing binary coded digital information as to the amount of the over-run allowance. Since these contacts are associated only with the lowest order digit, a maximum over-run feed allowance in the illustrated embodiment is 9 units. To the other set of fixed contacts of switch 12 is connected through lines 14 means, again such as switches 27 or a reader, providing binary coded decimal information as to the amount of the dribble feed allowance. Since these contacts are associated with both lower order digits, a maximum dribble feed allowance in the illustrated embodiment is 99 units.

During the fast feed of material to the weigh hopper the switch 12 is in its illustrated position to connect lines 14 with the dribble allowance information from contacts 27 to adding circuits 7 and 9, whereas during the dribble feed of material switch 12 connects lines 13 with the over-run allowance information to adding circuit 7. Since the circuits 7 and 9 function only to provide carry signals C, their output terminals other than 7a and 9a for the carry signals are not employed.

Since carry signals representing 100 units may be furnished from both stages 5 and 9, these are fed through half-adder circuit 11 which, if carry signals are present at its two input terminals A and B from both stages 5 and 9, passes a carry signal from terminal C to the second stage (2) in the 100's units adder 6 thereby to carry 200 units; whereas if a carry signal is present at only one of the terminals A and B, then the half-adder passes from terminal S a signal to the first stage (1) of circuit 6 indicative of 100 units.

Connected to the "carry" output terminal 6a of the highest order adding circuit 6 is an amplifier 15 which on receipt of a carry signal from circuit 6 operates a stepper or latch relay 16 connected in a control circuit of the means 28 feeding material to the weigh hopper 24.

In operation and assuming the above numerical example, contact bank 17 receives digital information of the instantaneous net weight of material in the weigh hopper 24, the tare weight of the hopper having been previously balanced. The contact banks 18, 14, and 13, respectively, receive digital information representing the nines complement of the required weight, i.e. 999−456=543, the dribble allowance of 27 units, including the over-run allowance of 9 units. The first adding circuit 3 receives a signal representing 1 unit at terminal 2a. The feed material to the weigh hopper commences with moving contacts of latch relay 16 advancing to fast terminals 34 and switch 12 connecting the dribble feed allowance to the adding circuits 7 and 9. The fast feed continues until a carry signal is furnished from circuit 6 indicative of a sum of 1000 units whereupon the amplifier 15 oprates the relay 16 to change the feed from a fast to a slow or dribble rate and to change over switch 12 to connect the over-run allowance information to the adding circuits. At the instant of operation of the relay 16, the instantaneous weight of material in the weigh hopper is 1000−(543+27+1)=429 units as required. After switch 12 transfers, the dribble allowance of 27 is replaced by the over-run allowance of 9 which thus reduces the count to less than 999 or 1000 in the adder. The dribble feed continues until a carry signal is furnished at terminal 6a for the second time whereupon relay 16 is operated to de-energize the feed mechanism at which instant the instantaneous weight of the load in the weigh hopper is 1000−(543+9+1)=447 so that after the over-run of the weigh hopper, the required weight of 456 units is attained.

In the case of an automatic weighing apparatus intended to weigh a sequence of equal amounts of a material in the weigh hopper, the commencement of the material feed, the change from fast to dribble feed, the de-energization of the feed mechanism, and the discharge of material from the weigh hopper may be controlled in known manner by a sequencing switch, for example a multiple contact relay operated rotary stepping switch, under the control of the relay 16.

In the case of an automatic weighing apparatus intended to weigh a sequence of varying predetermined weights of the same or different materials, with discharge of the weigh hopper after delivery of each or after an accumulation of weighments therein, this can be accomplished by programming the necessary digital information as to the separate or cumulative complements of the required weights and the dribble and over-run allowances on the switches or reader feeding the control banks 18, 14 and 13 respectively, and co-ordinating their operation with that of the illustrated circuit by means of the sequencing switch.

The present system thus allows the use of relatively simple digital devices in a weighing system and does not rely on memory of previous conditions which might easily be destroyed. This is particularly important where the power supply is occasionally interrupted during automatic weighing operations. With a system as described above, when the power is again turned on, the electronics of the system indicates the condition of the weighment immediately.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Automatic weighing apparatus comprising: weighing mechanism for providing digital information in the form of a pattern of signal voltages simultaneously available on a plurality of electrical conductors wherein each signal voltage in said pattern is either a value representative of a unit condition or a value representative of a zero condition for indicating the instantaneous weight of material in a weigh hopper, means for supplying digital information in the form of a pattern of similar signal voltages of the difference between a given number and the required weight to be delivered to the weigh hopper, an adding circuit for adding together said instantaneous weight information and said difference information, and material feed control means responsive to a signal derived from said adding circuit when its addition reaches said given number.

2. Apparatus according to claim 1, wherein said given number is equal to one unit of the next higher decade order than the digital capacity of said adding circuit, and wherein said means for supplying digital information of said difference does so by supplying information of the nines complement of the required weight to a first set of input terminals of the adding circuit, and said apparatus includes means for supplying electrically one unit to an input of the lower order stage in the adding circuit.

3. Apparatus according to claim 1, including means for supplying to the adding circuit digital information in the form of a pattern of signal voltages similar to said previously mentioned signal voltages of an allowance, so that said material feed control means is actuated when the weight of material in the weigh hopper is equal to the required weight less said allowance.

4. Apparatus according to claim 3, wherein said material feed control means comprises switching means, and wherein said allowance is composed of a dribble feed allowance in one circuit and an over-run allowance in another circuit, and includes means for alternately supplying said dribble feed and said over-run allowances to said adding circuit.

5. Apparatus according to claim 4, wherein said switching means includes means to disconnect from the adding circuit said means for supplying said dribble feed allowance, and means to connect to the adding circuit said means for supplying said over-run allowance.

6. An automatic weighing apparatus comprising:
(a) a scale,
(b) means to feed material to said scale,
(c) first means to supply a first pattern of signal voltages in a digital code to provide a continuous indication of the weight of material on said scale, said pattern of signal voltages being simultaneously available on a plurality of electrical conductors,
(d) second means to supply a similar second pattern of signal voltages in said digital code to provide a difference between a given number and the required weight of said material to be weighed on said scale,
(e) adding means for both said first and second patterns of signal voltages, and
(f) means responsive to an output signal from said adding means for controlling said feeding means.

7. An apparatus according to claim 6 wherein said first code voltage supply means comprises a reticule on a shaft connected to be rotated in accord with the weight of material on said scale and a plurality of separate devices connected in a plurality of signal channels for producing said pattern of signal voltages in accord with the rotational position of said reticule.

8. An apparatus according to claim 7 wherein said adding means comprises a separate adding circuit for each decimal order digit of said adding means, each digit is coded in the form of a binary coded decimal in four signal channels, and the pattern of signal voltages is determined by the individual voltage levels in each of said four signal channels for each decimal digit.

9. An apparatus according to claim 6 wherein said given number is one higher than the digital capacity of said adding means, and wherein said adding means includes means for adding one unit separately to the resulting addition made therein by adding one to the lowest order adding circuit.

10. An apparatus according to claim 6 wherein said means for controlling said feeding means comprises an amplifier connected to said adding means, an electromagnetic device controlled by said amplifier means, and switches controlled by said electromagnetic device.

11. An automatic weighing apparatus comprising:
(a) a scale,
(b) means to feed material to said scale,
(c) first means to supply a first pattern of signal voltages in a digital code to provide continuous indication of the weight of material on said scale,
(d) second means to supply a similar second pattern of signal voltages in said digital code to provide a difference between a given number and the required weight of said material to be weighed on said scale,
(e) a first adding means having separate adding circuits for each of three digit orders with means for providing a carry from the lowest order to the second lowest order, each adding circuit having eight input terminals, with four of said terminals connected to receive said first patterns of signal voltages and four of said terminals connected to receive said second pattern of signal voltages,
(f) third means to supply a similar third pattern of signal voltages in said digital code of an allowance,
(g) a second adding means for the lower order digits only connected to receive the output signals of the corresponding order digits from the first adding means and to receive the allowance signal voltages,
(h) means connecting the output signal from the second adding means to provide a carry signal to the next higher order digit in the first adding means, and
(i) means responsive to the output signal from the highest order of said first adding means for controlling said feeding means.

12. An automatic weighing apparatus according to claim 11 wherein said third means to supply an allowance comprises means to supply a dribble feed allowance and means to supply an over-run allowance, and wherein said means for controlling said feed means includes a switch for alternatively connected said means for supplying said dribble feed allowance and said means for supplying said over-run allowance to said second adding means.

References Cited by the Examiner

UNITED STATES PATENTS

| | | | |
|---|---|---|---|
| 2,431,058 | 11/1947 | Manning | 222—2 |
| 2,871,399 | 1/1959 | Scuitto | 315—8.6 |
| 3,035,648 | 5/1962 | Williams | 177—70 |
| 3,039,686 | 6/1962 | Bell et al. | 235—151 |
| 3,061,026 | 10/1962 | Hecox et al. | 177—210 X |
| 3,089,555 | 5/1963 | Harris et al. | 177—81 |

LOUIS J. CAPOZI, *Primary Examiner.*

LEO SMILOW, *Examiner.*

G. J. PORTER, *Assistant Examiner.*